April 17, 1945.   J. R. BARBER   2,373,804
HAY AND SHOCK LOADER
Filed Aug. 26, 1942   2 Sheets-Sheet 1
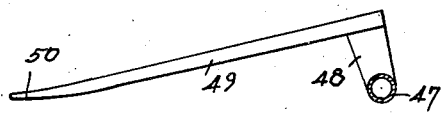
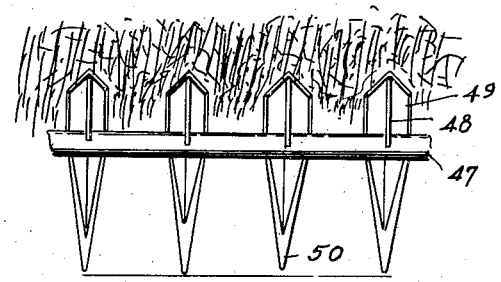
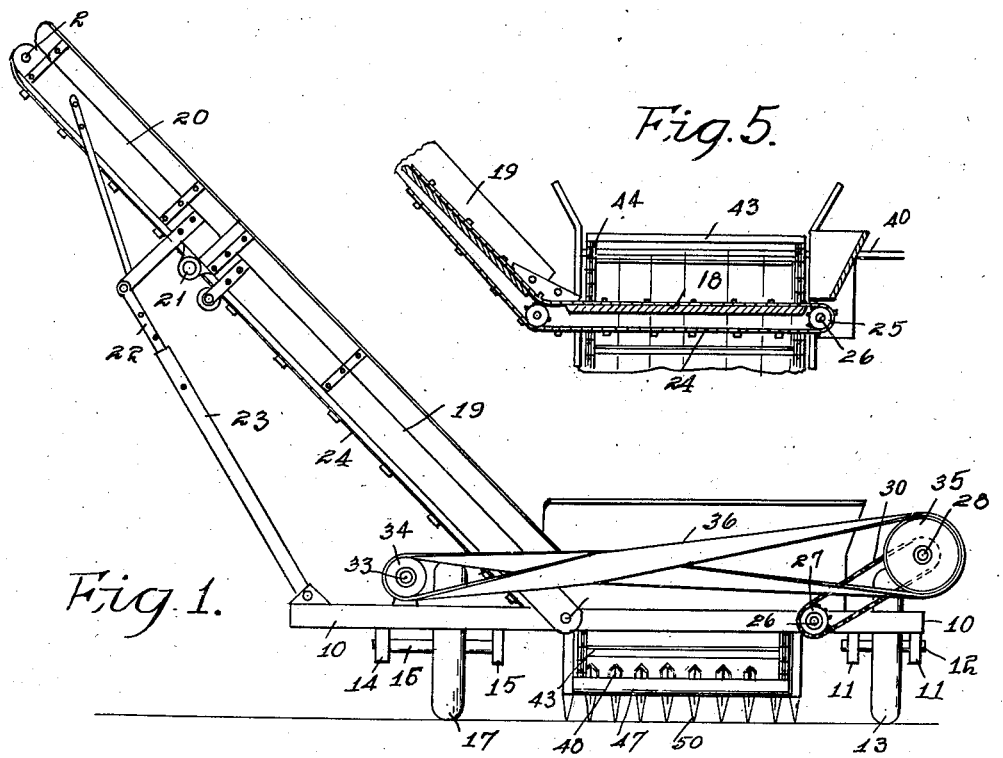

April 17, 1945.　　　J. R. BARBER　　　2,373,804
HAY AND SHOCK LOADER
Filed Aug. 26, 1942　　　2 Sheets-Sheet 2
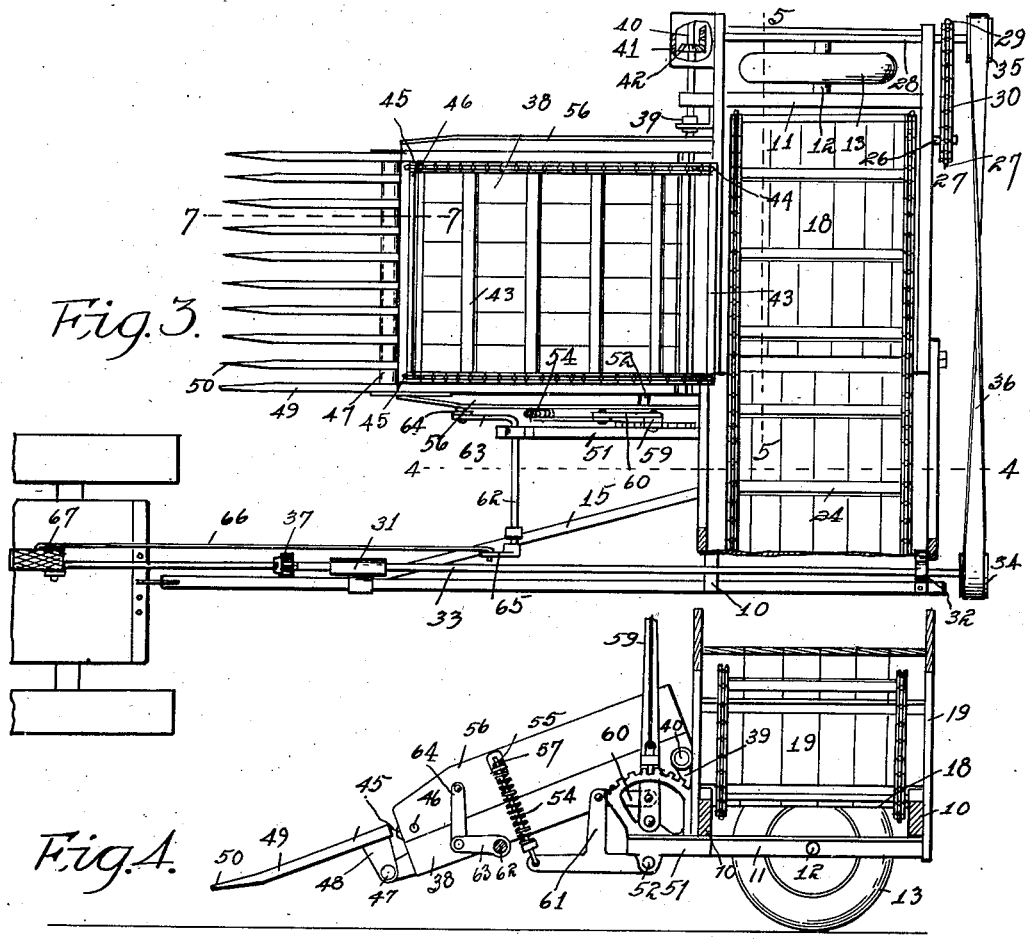
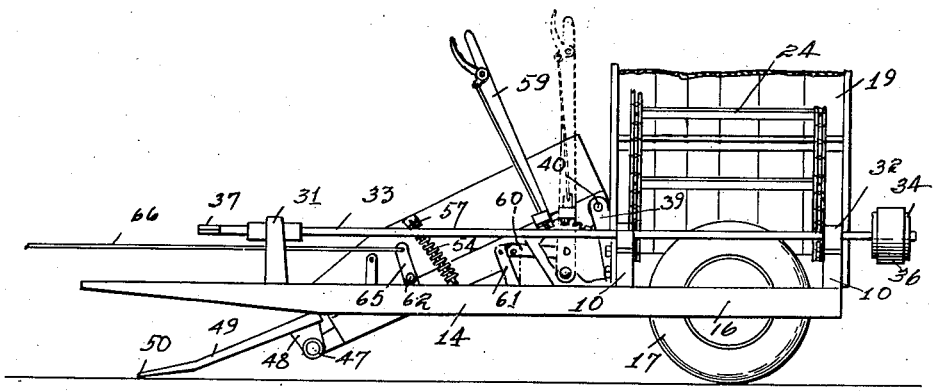
Inventor
Jesse R. Barber Patented Apr. 17, 1945

2,373,804

UNITED STATES PATENT OFFICE 2,373,804

HAY AND SHOCK LOADER

Jesse R. Barber, Lavinia, Iowa

Application August 26, 1942, Serial No. 456,183

2 Claims. (Cl. 56—357)

This invention relates to improvements in hay and shock loaders so constructed and arranged that hay may be gathered from a windrow and delivered to a wagon or other suitable carrier in a continuous manner as the wagon is advanced over the ground surface, and also adapted to gather and load shocked material such as small grain, hay or soy beans.

In the gathering of hay, preferably in windrows, it is desirable and necessary that the free ends of the gathering tines be kept in contact with the ground surface continuously as the loader is advanced and the loading operation takes place, inasmuch as the windrows are usually continuous.

When it is desired to utilize the loader for gathering shocks which are usually arranged in rows and spaced apart a considerable distance, it is desirable that the gathering tines be maintained in an elevated position out of contact with the ground to prevent wear and also to reduce the draft of the device.

One object of my invention is to provide a loader so constructed and arranged that it is adapted to operate under either of the above mentioned conditions, either for gathering hay and the like from the windrow and with the tines in engagement with the ground surface, or for gathering shocks with the tines out of contact with the ground surface, and to provide means whereby the device may be easily and quickly adapted to either of said working conditions.

More specifically, it is the object of my invention to provide in a loader of that type employing a side delivery elevator and a gathering elevator, the last said elevator having tines for gathering material from the ground surface, improved means wherein the tines may be yieldably supported in an elevated position, and in connection therewith remote controlled and manually operated means for momentarily lowering the tines to operative position for gathering shocks.

A further object is to provide in connection with a loader of the type above mentioned, means wherein the yieldable tine supporting means may be adjusted to permit the tines to normally rest on the ground surface for gathering material from continuous windrows.

A further object is to provide in a loader employing a gathering conveyor having gathering tines, improved tine construction arrangement wherein material gathered by the tines may be more readily delivered to the gathering conveyor without engagement with supporting elements for the tines.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a rear elevation of my improved loader;

Figure 2 is an end elevation of the same;

Figure 3 is a top view;

Figure 4 is a longitudinal sectional view taken on the line 4—4 of Figure 3;

Figure 5 is a detail sectional view taken on the line 5—5 of Figure 3;

Figure 6 is an enlarged diagrammatical view illustrating the manner in which the rear ends of the gathering tines are supported above the usual supporting bar, and the manner in which material gathered thereby is supported above said bar; and Figure 7 is a sectional view taken on the line 7—7 of Figure 3.

My improved loader comprises a frame consisting of a pair of horizontal and transversely arranged sills 10 supported at one end by means of longitudinally arranged members 11, the members 11 having an axle 12 supporting a wheel 13. Near the opposite ends of the members 10 are longitudinally arranged members 14 and 15 having an axle 16 supporting a wheel 17. The member 14 extends forwardly of the members 10 forming a draw bar for the loader. The member 15 is arranged diagonally, as illustrated in Figure 3, and serves to brace the frame member.

Supported on the members 10 is a platform 18, and adjacent to one end of said platform a pivoted elevating conveyor 19 having a hinged upper section 20, said sections being hinged together by means of hinge members 21 and adapted to be folded by adjustment of the brace members 22 relative to the adjacent brace members 23. This construction, however, is conventional in various elevators and forms no part of my present invention other than the illustrated means for delivering material from the platform 18. The elevator 19 and the platform 18 are provided with an endless conveyor 24 operating over sprockets 25 mounted on a shaft 26, which in turn is mounted on the frame members 10, the outer end of the shaft 26 being provided with a sprocket 27. The frame members 10 are provided with a shaft 28 having a sprocket 29, the sprockets 27 and 29 being provided with a chain 30. The frame member 14 is provided with bearings 31 and 32 rotatably supporting a drive shaft 33 having its rear end provided with a belt pulley 34, the shaft 28 having a belt pulley 35, said pulleys being rotatably connected with a twisted belt 36. The forward end of the shaft 33 is provided with a squared portion 37 adapted to receive the coupling device connected with the power take-off shaft of the farm tractor to which the member 14 is connected. Thus means is provided for driving the conveyor 24 by the shaft 33 by means of the belt 36 and the chain 30.

For delivering material to the platform 18 I have provided what I shall term a gathering platform 38 pivotally supported on a shaft 40 rotatably supported in bearing members 39 carried by the forward one of the frame members 10. The shaft 40 has one end extended into a gear box 41 and operatively connected with the shaft 28 by means of mitre gears 42. An endless conveyor 43 is mounted on the platform 38 adapted to travel over sprockets 44 fixed to the shaft 40 and around sprockets 45 mounted on the shaft 46 at the lower end of the platform 38. Below and forwardly of the shaft 46 is a tubular bar 47 having a series of upwardly extending supports 48, the upper end of each of said supports 48 being provided with a downwardly and forwardly extending tine 49, the forward ends of the tines terminating in the contracted portions 50, the members 49 being preferably in the form of an angle iron with its flanges supported at an angle of 45° relative to the bar 47, as illustrated in Figure 6. The back ends of the members 49 are supported substantially in a plane common to the upper surface of the platform 38 in such a manner that as the tines are advanced over the ground surface in the inclined position substantially as illustrated in Figures 2 and 7, the portions 50 will enter beneath the material to be loaded. This said material is crowded rearwardly and upwardly and slid along the top of the members 49 to the conveyor 43, so that the material is supported above the cross bar 47 to such an extent that it does not drag on the bar to hold the material against its upward and rearward movement, the material being supported above the bar 47 substantially as illustrated in Figure 6. This provides means whereby the material may be delivered to the gathering platform 38 without any additional gathering devices.

For maintaining the free ends of the tines 50 elevated above the ground surface at such times as the machine is being advanced from one shock to another, and to provide means wherein said tines may be easily and quickly lowered to operative position, and further to provide means whereby the tines may be normally maintained against the ground surface at such times as the device is being used to gather hay and the like, I have provided the following mechanism: On the under surface of the members 10 I have provided forwardly extending frame members 51, having at their forward ends a rock shaft 52. On each end of the rock shaft 52 I have provided a forwardly extending rock arm 53, the forward end of each of said arms 53 being pivotally connected to the lower end of an upright extension spring 54, the upper end of which is supported by a bracket 55 carried by the side members 56 of the platform 38. A nut 57 is mounted on the upper end of a shaft 58 extending through said spring and provides means for limiting the upward movement of the platform 38 relative to the rock arms 53. By this arrangement it will be seen that the weight of the forward end of the gathering platform 38 is carried by the yieldable springs 54. A lever 59 is provided for adjusting the rock shaft 52 by means of a link 60 and an upright member 61 carried by one of the rock arms 53. If the upper end of the lever 59 is moved forwardly then the forward ends of the rock arms 53 are lowered, causing the springs 54 to be lowered, and in turn the tines 49. However, if it is desired to maintain the tines in an elevated position, the lever is set in the position illustrated in Figure 4.

Carried by the member 15 and one of the members 51 is a rock shaft 62 having a crank 63 on one end to which a crank 64 is connected, which in turn is connected to one of the side members 56. A rock arm 65 is mounted on the opposite end of the shaft 62 to which a rod 66 is connected, the forward end of which is preferably connected to a foot pedal 67 which may be mounted on the tractor to which the member 14 is attached.

When it is desired to lower the forward end of the tines 49 when gathering shocks the upper end of the pedal 67 is moved forwardly, causing the shaft 62 to be rocked, the link 64 lowered and the forward end of the platform 38 lowered against the tension of the springs 54. By this arrangement it will be seen I have provided a shock loader which may be utilized to gather and elevate material directly from the windrow in a continuous manner or may be used to gather shocks spaced apart a considerable distance, the lever being converted from a shock gatherer with the tines formed in the position shown in Figure 4, to position for gathering material from the windrow in a continuous manner, as illustrated in Figure 2, by simply moving the lever from the dotted line position in Figure 2 to the solid line position.

In operation the device is advanced with the material being carried on to the gathering platform 38 for movement by the conveyor 24 to the platform 18 and on top of the conveyor 24 and then elevated and delivered over the upper end of the section 20, to a suitable wagon or other conveying means.

It will further be seen that I have provided in a hay and shock loader an improved tine construction used in connection with a gathering conveyor wherein the material may be sufficiently delivered to the gathering conveyor without obstruction or clogging.

It will further be seen that I have provided a shock loader of comparatively simple, light and cheap construction which may be easily and quickly attached to the ordinary farm tractor and in which is employed a very simple and efficient means for delivering power from the tractor to the gathering and elevating conveyors.

I claim as my invention:

1. In a device of the class described, a portable supporting frame, including a transversely arranged elevator, a forwardly extending gathering conveyor adapted to deliver material to said elevator having its rear end pivoted near said elevator, gathering tines connected to and extending forwardly of said gathering conveyor, means for raising and lowering the free ends of said tines, comprising a rock shaft, forwardly extending rock arms carried by said shaft, an extensible spring having one end supported by the free end of each rock arm, means connecting the other end of each spring to a respective side of said gathering conveyor, a hand lever, means for locking the hand lever to various adjusted positions, means operatively connecting said hand lever to said rock shaft, a second rock shaft, a rock arm carried thereby, a link connecting the last rock arm to said gathering conveyor, and manually operated means for actuating the last rock shaft for lowering the gathering elevator for the purpose stated.

2. In a grain loader including a portable frame structure having elevator means, a forwardly extended gathering conveyor for delivering grain to said elevator means, pivot means supporting said gathering conveyor adjacent its rear end on said frame structure, a rock shaft located below said pivot means and rotatably supported on said frame structure in a substantially parallel relation with said pivot means, an arm mounted on said rock shaft and extended forwardly therefrom, spring means arranged in compression between the free end of said rock arm and a forward portion of said gathering conveyor to normally yieldably support the front end of said gathering conveyor, adjustable means for rotating said rock shaft to elevate the front end of said gathering conveyor, means for locking said adjustable means in an adjusted position, a second rock shaft rotatably supported on said frame structure forwardly of said first rock shaft, an arm on said second rock shaft operatively connected with said gathering conveyor, and manually operated means for rotating said second rock shaft to move the front end of said gathering conveyor relative to its normally supported position on said spring means.

JESSE R. BARBER.